United States Patent [19]

Carlin et al.

[11] Patent Number: 5,764,706

[45] Date of Patent: Jun. 9, 1998

[54] AM COMPATIBLE DIGITAL WAVEFORM FRAME TIMING RECOVERY AND FRAME SYNCHRONOUS POWER MEASUREMENT

[75] Inventors: Barry W. Carlin; Mark J. Dapper, both of Cincinnati; Michael J. Geile, Loveland, all of Ohio

[73] Assignee: USA Digital Radio Partners, L.P., Linthicum, Md.

[21] Appl. No.: 636,044

[22] Filed: Apr. 22, 1996

Related U.S. Application Data

[60] Provisional application No. 60/003,017, Aug. 31, 1995.
[51] Int. Cl.[6] ............................................. H04L 27/14
[52] U.S. Cl. ........................... 375/326; 375/355; 370/203; 370/206
[58] Field of Search .................... 375/320, 324, 375/326, 355, 346; 370/203, 206, 207

[56] References Cited

U.S. PATENT DOCUMENTS

| | | | |
|---|---|---|---|
| 5,282,222 | 1/1994 | Fattouche et al. | 375/200 |
| 5,406,551 | 4/1995 | Saito et al. | 370/203 |
| 5,444,697 | 8/1995 | Leung et al. | 370/207 |
| 5,471,464 | 11/1995 | Ikeda | 370/203 |
| 5,588,022 | 12/1996 | Dapper et al. | 375/216 |

*Primary Examiner*—Stephen Chin
*Assistant Examiner*—Don N. Vo
*Attorney, Agent, or Firm*—Townsend and Townsend and Crew; Kenneth R. Allen

[57] ABSTRACT

In a broadcast system having a complex waveform of digital and analog segments, frame timing is recovered and the frame synchronous power of the digital portion of the composite AM compatible Digital Audio Broadcast (DAB) waveform is measured by examining a portion of the signal. The frame timing necessary for proper demodulation is recovered from the received signal, and a signal power measurement for scaling is provided. The composite AM compatible DAB waveform is produced by a modulation method in which a digital representation of an audio signal is encoded together with an analog amplitude modulated (AM) signal and transmitted simultaneously in the same frequency channel.

9 Claims, 5 Drawing Sheets

Integration Intervals

AM COMPATIBLE DIGITAL WAVEFORM FRAME TIMING RECOVERY AND FRAME SYNCHRONOUS POWER MEASUREMENT

BACKGROUND OF THE INVENTION

This invention claims priority from a provisional application, U.S. Provisional Application Number 60/003,017, filed Aug. 31, 1995.

This invention relates to waveform demodulation and more particularly to methods of and apparatus for frame timing recovery and frame synchronous power measurement in receiving and demodulating digitally modulated signals.

There has been increasing interest in the possibility of broadcasting and receiving digitally encoded signals to provide improved audio fidelity. Several approaches have been suggested, including out-of-band techniques in which the digital radio signals are broadcast in a specially-designated frequency band and in-band techniques in which the radio frequency signals are broadcast within available spectrum slots between adjacent channels in the existing broadcast band (interstitial approach) or within the spectrum allocations currently used by commercial broadcasters (in-band on-channel or IBOC approach). The IBOC approach may be implemented without the need for additional frequency coordination and with relatively minor changes to existing transmitting equipment without perceptible degradation of the existing analog signal.

IBOC approaches to digital audio broadcasting have been proposed in the FM band (88 Mhz to 108 Mhz). Since the allocable bandwidth of AM channels is quite narrow compared to the FM band, the use of digital audio broadcasting in the AM band (530 kHz to 1700 kHz) presents special challenges. A reliable high-fidelity IBOC approach in the AM band would provide AM broadcast stations with a viable means to compete with high quality, portable audio sources such as cassette tapes and compact disc players. It would therefore be desirable to extend the concept of IBOC broadcasting to AM broadcasting frequencies to provide enhanced fidelity through digital signalling without affecting reception by existing analog AM receivers.

The following patent application relates to developments in digital broadcasting techniques which may be applied to the AM broadcast frequency allocation in connection with this invention:

U.S. Patent Application for "Method and Apparatus for AM Compatible Digital Broadcasting" U.S.Ser. No. 08/206,368, filed Mar. 7, 1994 which is now U.S. Pat. No. 5,588,022. This application describes an environment related to the present invention. The disclosure therein describes the waveform modulation format and apparatus for modulation and demodulation. The composite modulation scheme is explained hereinafter as it relates to the present invention.

One of the challenges in development of a viable IBOC approach for the AM band is the recovery of frame timing from the broadcast signal in order to maintain signal coherence and synchronization. The present invention addresses that problem.

SUMMARY OF THE INVENTION

According to the present invention, in a digital broadcast system, frame timing is recovered and the frame synchronous power of the digital portion of a composite AM compatible Digital Audio Broadcast (DAB) waveform is measured by processing a digitally-modulated segment of the waveform, particularly the binary phase-shift keyed (BPSK) portion of the signal. The frame timing necessary for proper demodulation is thus recovered from the received signal, and a signal power measurement for scaling is provided. The composite AM compatible DAB waveform is produced by a modulation method in which a digital representation of an audio signal is encoded together with an analog amplitude modulated (AM) signal and transmitted simultaneously in the same frequency channel. (A description of an appropriate AM compatible DAB waveform, along with a description of a method to perform demodulation, is presented in U.S. patent application Ser. No. 08/206,368, filed on Mar. 7, 1994 which is now U.S. Pat. No. 5,588,022, which is herein incorporated by reference and explained to some extent hereinafter.)

A frame timing recovery and frame synchronous power measurement apparatus according to the invention comprises a frame synchronizer and a frame power measurement circuit for providing signals for frame synchronization and scaling, wherein the frame synchronizer includes a numerically controlled oscillator for providing a first stable reference signal; a phase shifter for providing a second stable reference signal at a fixed 90° phase offset to the first stable reference signal; a first mixer for mixing the first stable reference signal with a received quadrature phase component signal to produce a first mixed signal; a second mixer for mixing the second stable reference signal with the received quadrature phase component signal to produce a second mixed signal; a first integrator for integrating the first mixed signal over one frame interval to produce a first integrator output signal; a second integrator for integrating the second mixed signal over one frame interval to produce a second integrator output signal; a multiplier for forming the product of the first and second integrator output signals to produce an error value, which is used to alter the timing of the analog-to-digital (A/D) conversion of the received signal; an absolute value measurement circuit for measuring the absolute value of the first integrator output signal; a variance measurement circuit for measuring the variance of the absolute value circuit output signal; and a comparator circuit for comparing the variance value with a threshold value to produce a slip one-half command signal to slip phase of the A/D conversion clock by one-half symbol time.

The present invention assists in providing an in-band, on-channel (IBOC) solution to digital audio broadcasting (DAB) in the AM frequency band, specifically in the demodulation of DAB signals.

The advantages of the present invention include: (1) stable conversion timing, (2) the detection and correction of frame timing which is out of phase by one-half symbol and (3) the production of a frame synchronous power measurement for the control of scaling circuitry.

The invention will be more readily apparent to those skilled in the art by reference to the accompanying drawings.

DETAILED DESCRIPTION OF SPECIFIC EMBODIMENTS

This invention provides a method of recovering frame timing information and measuring frame synchronous power of a particular form of an AM compatible DAB signal.

Figure 4:
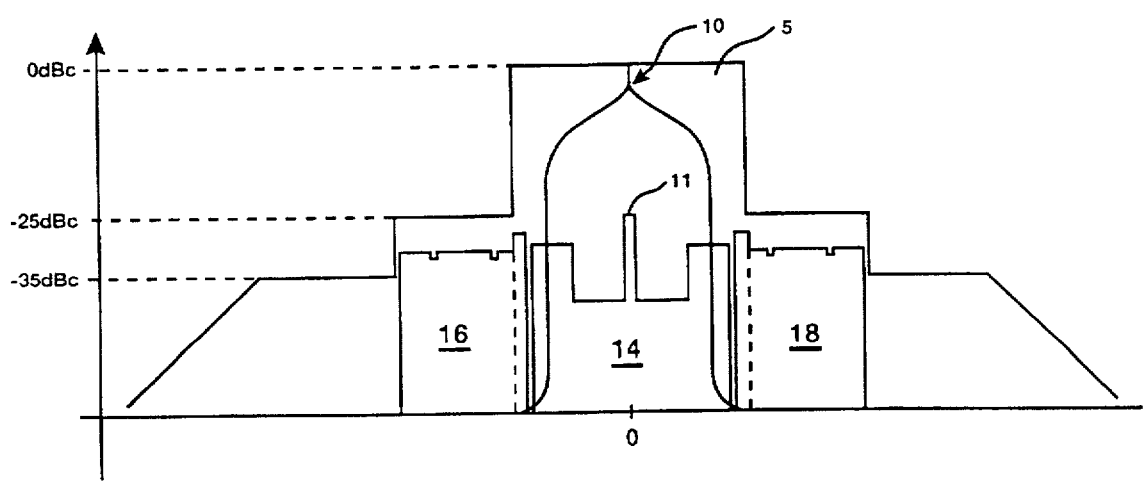
FIG. 4 is a spectral representation of a digital broadcasting signal of the present environment.

Shown in FIG. 4 is a spectrum 5 of what is herein called an AM DAB waveform of the type used in connection with the present invention. It employs orthogonal frequency division multiplexing (OFDM). The AM DAB waveform may contain pulse amplitude modulation (PAM), phase-shift keying (PSK), quadrature amplitude modulation (QAM) and other forms of modulation. These are commonly-used digital modulation formats.

Spectrum 5 consists of in-phase and quadrature components. Envelopes of the various spectral regions are outlined as blocks. Energy may be contained anywhere within those envelopes, subject to phase restrictions, as hereinafter explained. The in-phase component includes a conventional analog AM signal 10 and digital carriers in a first in-phase channel 16 and a second in-phase channel 18. However, the in-phase digital carriers do not have any energy in the spectral region occupied by analog AM signal 10. The quadrature portion of spectrum 5 contains signals in the form of digital carriers in center channel 14, in first channel 16, and in second channel 18. The digital carriers in center channel 14 do not have a component that is in phase with the analog carrier, thereby minimizing distortion to the analog signal. The carriers in first channel 14 are called complementary carriers because the modulation of each set of carriers equidistant in frequency from the analog carrier is constructed such that there is not a component that is in phase with the analog carrier. In addition, phase-based detection should be able to separate more easily analog and digital information.

Carriers in first and second channels 16 and 18 have both an in-phase and quadrature component, and they are non-complementary carriers. There is no digital carrier located at the carrier frequency of analog AM signal 10 (which is located at the center of the center channel 14).

Binary phase-shift keying (BPSK) may be used to modulate the two innermost digital carriers, namely carrier signals 11 on either side of the carrier frequency of the analog signal 10. The frame timing of a summed digital signal 75 (the source or original digital signal, generated as in FIG. 5) can be recovered from carrier signals 11 (FIG. 4) to properly demodulate the digital portion 75 of transmitted waveform 170.

Figure 5:
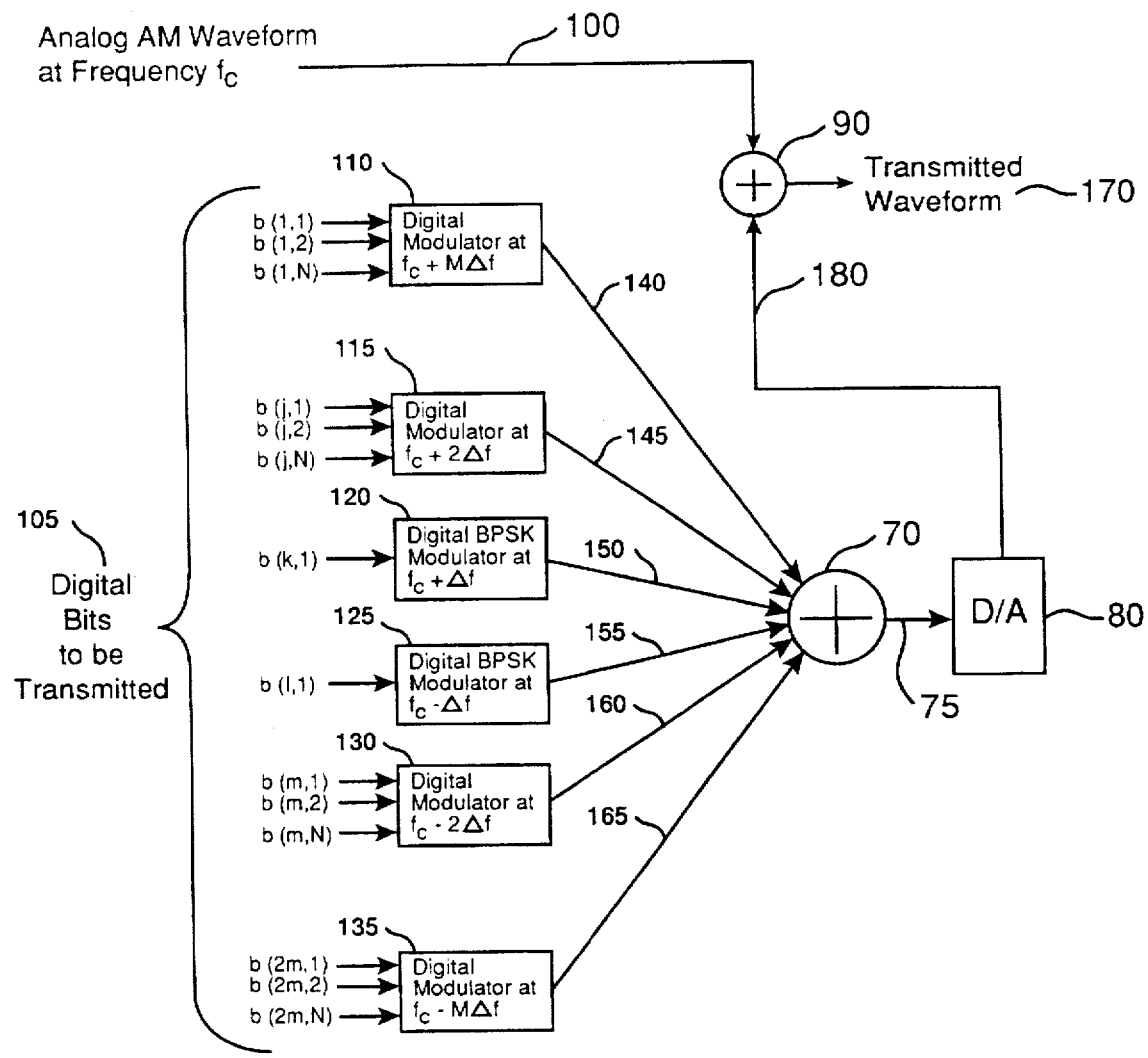
FIG. 5 is a block diagram which conceptually shows the modulation scheme used to produce the composite AM DAB signal for which timing recovery and power measurement according to the invention takes place.

FIG. 5 shows conceptually how the AM DAB waveform is generated. The waveform consists of a conventional analog AM waveform and a digital component. Digital bits to be transmitted 105 modulate the BPSK and other types of digital signals. In OFDM-type modulation, digital signals are generated using carriers that are evenly spaced in frequency on each side of the channel center frequency. Carrier signals 11 are modulated using a BPSK format and are modulated such that their sum is in phase-quadrature to the analog AM carrier, as are additional complementary digital carriers which are located close to the analog carrier frequency (channel 14). Digital modulator outputs 140 through 165 are summed by a first summer 70, converted to summed analog signal 180 by a digital-to-analog (D/A) converter 80, and added to conventional AM signal 100 by a second summer 90.

Summed digital signal 180 is transmitted in time intervals called frames. For each frame, a different set of digital bits is used to modulate the digital carriers. The number of bits transmitted per second is equal to the number of bits transmitted per frame multiplied by the number of frames transmitted per second.

A demodulator according to the invention (FIGS. 1 and 2) must be synchronized with the frame timing of the received waveform to properly demodulate the digital carriers. The following explains how carrier signals 11 are used to recover the frame timing, and to provide a frame synchronous measurement of the power in the digital portion of the received signal.

Recovery of Frame Timing

Figure 1:
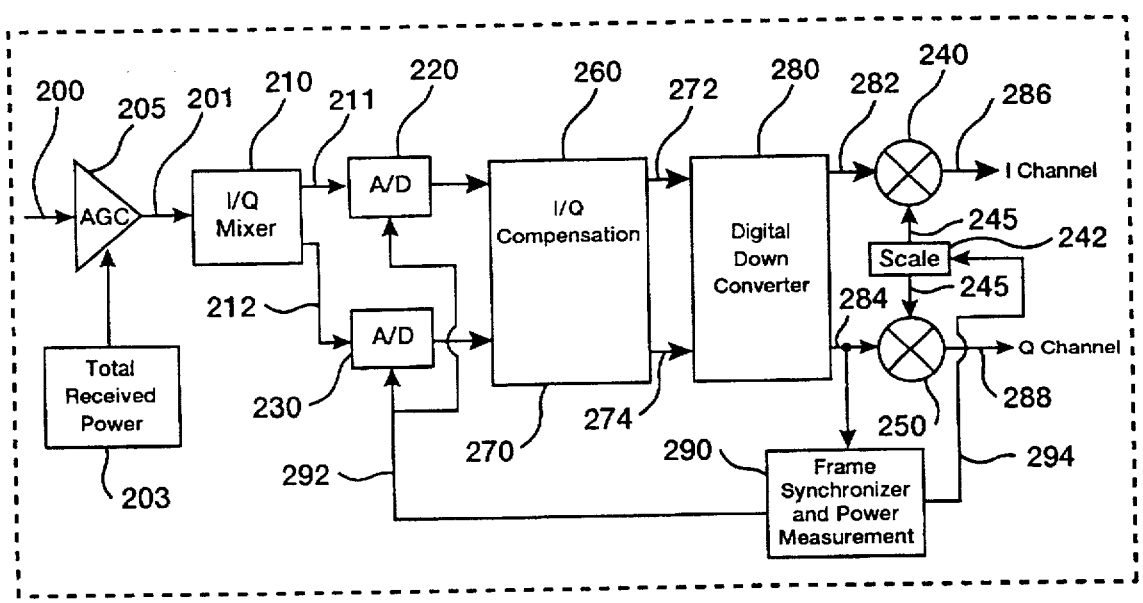
FIG. 1 is a block diagram of the portion of a receiver showing an example of a typical environment in which the present invention is to operate.

FIG. 1 illustrates a portion of an AM DAB demodulator. An incoming signal 200 is directed through an automatic gain control circuit 205 (AGC 205), which adjusts the level of signal 200 to provide a relatively constant amplitude signal 201 to the rest of the system. The AGC 205 is controlled by a total power measurement circuit 203, which measures the total power in the received signal for use in the control function. Signal 201 is then mixed down in frequency by an I/Q mixer 210, creating an I (in-phase) signal 211 and a Q (quadrature) signal 212. The oscillator that drives I/Q mixer 210 is neither frequency nor phase locked to the analog RF carrier. Therefore, although signals 211 and 212 are in quadrature, they are not the transmitted in-phase and quadrature signals. The I signal 211 is then converted by a first analog-to-digital (A/D) converter 220 to a digital format. Likewise, the Q signal 212 is converted by a second A/D converter 230 to a digital format. Compensation subcircuit 260 compensates for anomalies such as DC offset, gain imbalance, and phase offset in I/Q mixer 210 and A/D converters 220 and 230 to produce I signal 272 and Q signal 274. The I signal 272 and the Q signal 274 are then converted to baseband in a digital downconverter 280 and are output as an I channel signal 282 and a Q channel signal 284. Digital downconverter 280 is frequency- and phase-locked to the analog RF carrier. Signals 282 and 284 are therefore the recovered in-phase and quadrature signals, respectively.

A scaling circuit 242 produces scaling signal 245, which is used by a multiplier (mixer) 240 and a multiplier 250 to normalize the output signals. A scaled I channel signal (286) and a scaled Q channel signal (288) are then fed to the rest of the AM DAB receiver/demodulator (not shown) for further processing and information extraction. The Q channel signal 284 is also fed to a frame synchronizer and power measurement circuit 290, which generates an A/D clock signal 292 for the A/D converters and a frame synchronous power measurement signal 294 for scaling circuit 242.

Figure 2:
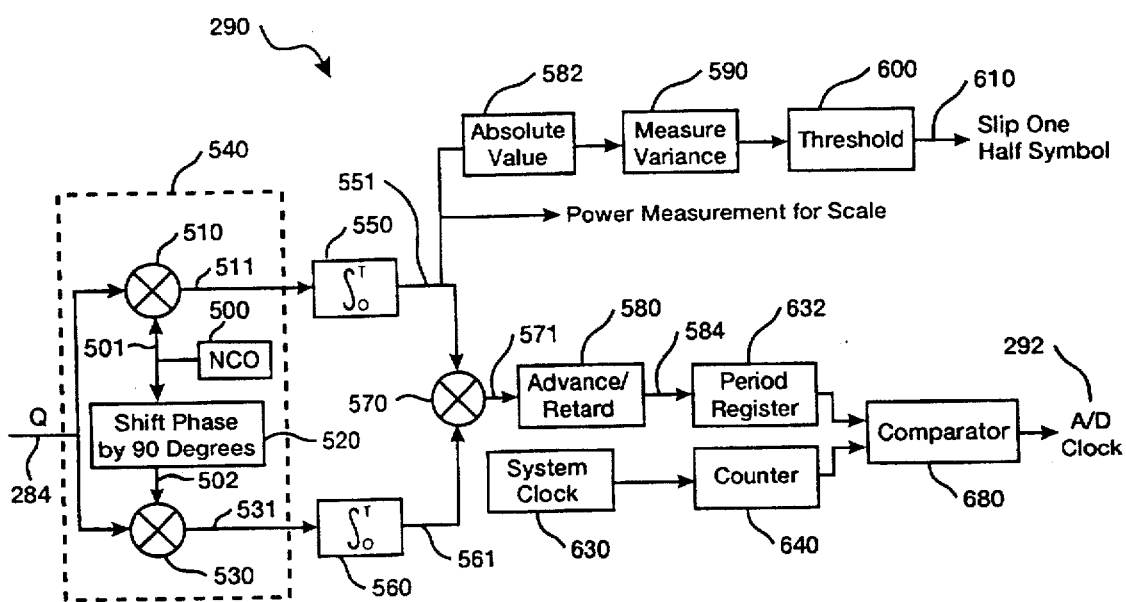
FIG. 2 illustrates how frame timing recovery and frame synchronous power measurement are performed in the present invention.
Figure 3A:
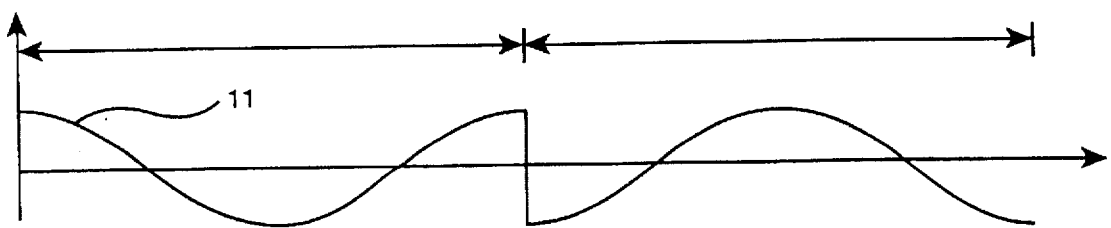
FIG. 3A–3E are a set of waveforms at selected test points in the frame synchronizer of FIG. 2.
Figure 3B:
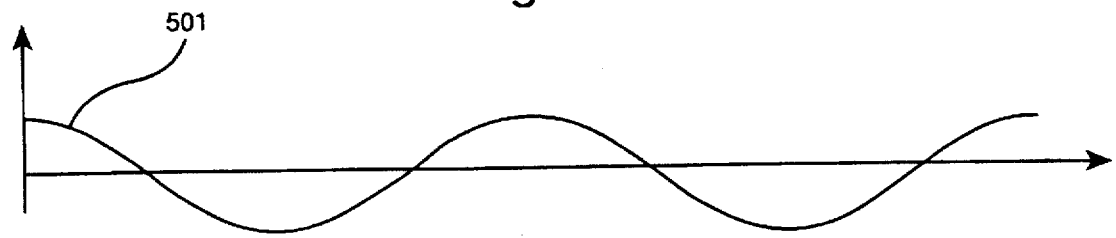
Figure 3C:
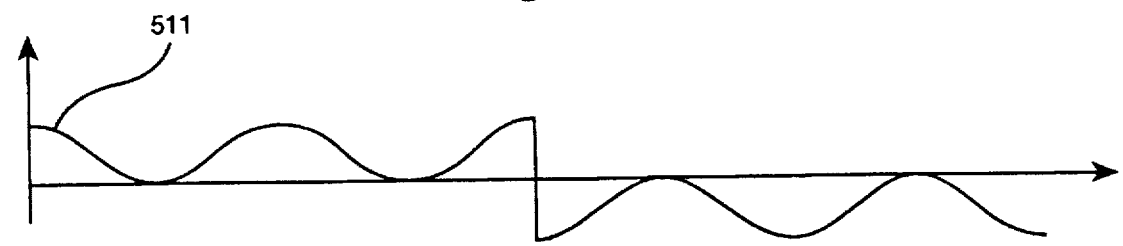
Figure 3D:
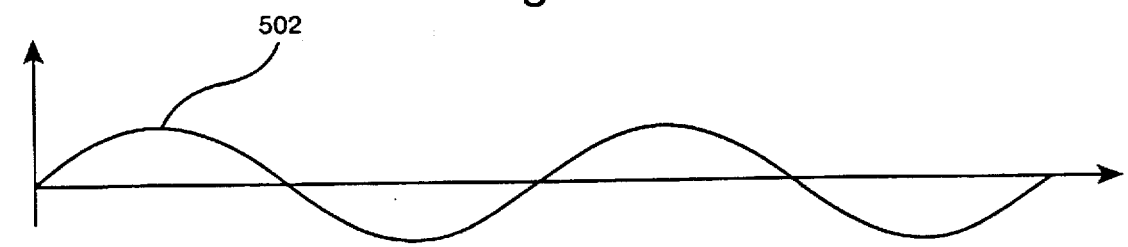
Figure 3E:
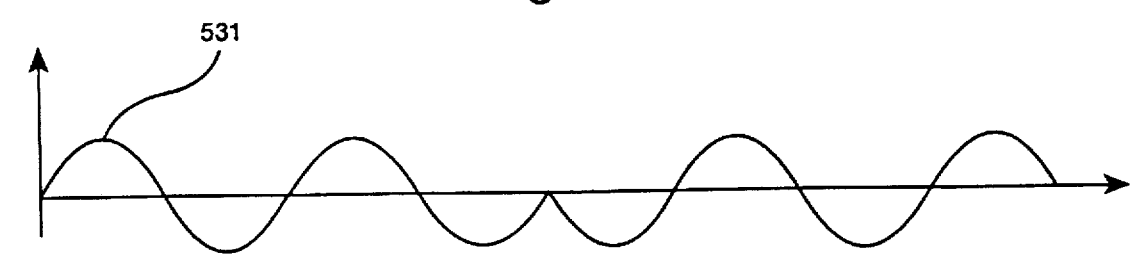

A block diagram of the frame synchronizer and power measurement circuit 290 is shown in FIG. 2. The Q channel signal 284 from element 280 (FIG. 1) is input to an I/Q downconverter 540. I/Q downconverter 540 has a numerically controlled oscillator 500 (NCO 500) that operates at a frequency equal to the carrier frequency of carrier signals 11 to output a stable reference signal 501. I/Q downconverter 540 also has a phase shifter 520, which shifts the phase of stable reference 501 by 90° to produce a phase-shifted stable reference 502. A mixer 510 and a mixer 530 both receive Q channel signal 284 at their respective inputs. Multiplier 510 mixes Q channel signal 284 with stable reference signal 501, producing a first mixed signal 511. Multiplier 530 mixes Q channel signal 284 with shifted stable reference signal 502, producing a second mixed signal 531. First mixed signal 511 and second mixed signal 531 are each integrated for a duration equal to one frame interval by a first integrator 550 and a second integrator 560, respectively. First integrator 550 and second integrator 560 produce a first integrated signal 551 and a second integrated signal 561, respectively.

FIGS. 3A–3E show waveforms for signals from stable reference 501 and shifted stable reference 502, first mixed signal 511 and second mixed signal 531, and carrier signals 11 under the assumption that the timing of NCO 500 and first integrator 550 and second integrator 560 are synchronized to the frame timing. As can be seen from examination of FIG. 3, integration for one frame of signal 511 to produce first integrated signal 551 (FIG. 2) will yield a fixed positive or negative output and integration (e.g., weighted averaging) for one frame of signal 531 to produce a second integrated signal 561 (FIG. 2) will have an output of zero. It is important to note that if the frame timing is synchronized, other digital carriers in Q channel signal 284, when mixed with reference signals 501 and 502 in mixers 510 and 530 respectively, will integrate to zero in integrators 550 and 560 because the frequency of the other digital carriers are integer multiples of the frequency of carriers 11.

Referring to FIG. 2, a multiplier 570 multiplies first integrated signal 551 and second integrated signal 561 to produce an error value signal 571 which drives an advance/ retard circuit 580. If integration timing is not synchronized to the frame timing of signal 200, second integrated signal 561 will no longer be zero, and the resultant error value 584 can be used to either advance or retard the timing (phase) of the integration interval. Specifically, the sign and magnitude of error value signal 571 can be used by the advance/retard circuit 580 to modify the contents of a period register 632. A counter 640 is employed to count the number of cycles generated by a system clock 630. Nominally, period register 632 contains the number of periods of system clock 630 per the conversion interval of first A/D converter 220 and second A/D converter 230. A comparator 680 compares the contents of period register 632 and counter 640 to generate A/D clock signal 292.

According to the invention, error value 584 modifies the contents of period register 632 such that A/D conversion occurs either sooner or later, depending on whether it is desired to advance or retard A/D clock signal 292. However, if the integration interval is mismatched to the frame timing of signal 200 by exactly one-half of a frame timing interval, the value of error signal 584 will be zero and frame synchronizer and power measurement circuit 290 will not adjust the contents of period register 632.

A solution to this problem according to the invention involves use of the output of a single one of the integrators. When the timing is off by one-half of a frame timing interval, the absolute value of first integrated signal 551 has larger variance than if the timing is correct. Therefore, as shown in FIG. 2, the variance of the absolute value (produced by absolute value function 582) of first integrated signal 551 may be measured by a using absolute value circuit 582 and variance measurement circuit 590 to provide a useful signal. If the variance of the absolute value of integrated signal 551 is larger than a preselected threshold, a "slip one-half symbol" signal 610 is sent to the period register 632 which controls synchronization. This signal merely causes the A/D conversion timing to be slipped (shifted) by exactly one-half symbol time.

Measurement of the Received Power on a Frame Synchronous Basis

Carrier signals 11 have a constant envelope, so the power in any frame for these carriers is constant. In contrast, the power of some of the other digital carriers can vary from frame to frame because their amplitudes can change. However, because the bits that are used to modulate the digital carriers are random, and because several signals are added together, the power transmitted in the digital component of the AM DAB waveform is relatively constant.

Although the overall power of the transmitted signal is relatively constant, the overall power in the received signal can change due to propagation effects. The receiver/ demodulator must compensate for these effects if the digital component of the AM DAB signal is to be properly demodulated. For an AM-compatible DAB waveform, this compensation can be achieved according to the invention merely by maintaining the constant power in the carrier signals 11 after reception. Referring to FIG. 2, according to the invention, first integrated signal 551 is used to measure the power of the BPSK symbols in one frame. The measurement of BPSK power over one frame is adequate to control the scaling circuit 242. The error signal is received via signal line 294 from the frame synchronizer 290 via the output of first integrator 550.

Although the foregoing invention has been described in some detail by way of illustration and example, for purposes of clarity of understanding, it will be obvious that certain changes and modifications may be practiced within the scope of the appended claims.

What is claimed is:

1. An apparatus for waveform frame timing recovery from a quadrature phase component signal of a received signal transmitted from a remote source, said received signal including an analog segment and a digital segment, said digital segment comprising an OFDM waveform with at least one pair of constant envelope carriers, wherein the sum of said pair of constant envelope carriers are in phase-quadrature with an analog segment carrier, said apparatus comprising:

a first stable reference means for producing a first stable reference signal;

a second stable reference means for producing a second stable reference signal at a constant quadrature offset from said first stable reference signal;

a first mixing means coupled to receive said quadrature phase component signal for producing a first mixed signal, said first mixing means being referenced to said first stable reference signal;

second mixing means coupled to receive said quadrature phase component signal for producing a second mixed signal, and said second mixing means being referenced to said second stable reference signal;

a first integrator coupled to receive said first mixed signal for integrating said first mixed signal over a time period to produce a first integrator output signal, said time period being an integer multiple of a frame duration;

a second integrator coupled to receive said second mixed signal for integrating said second mixed signal over said time period to produce a second integrator output signal; and a multiplying means coupled to receive said first integrator output signal and said second integrator output signal for multiplying said first integrator output signal and said second integrator output signal to produce an error value signal, said error value signal being representative of sign and magnitude of a frame time offset.

2. The apparatus according to claim 1 further including:

means coupled to said first integrator for establishing absolute value of the first integrator output signal;

means coupled to receive output of said absolute value establishing means for measuring variance of the absolute value of said first integrator output signal; and means coupled to receive said variance value for comparing said variance value with a threshold value to trigger a command signal to slip integration interval phase by one-half symbol time.

3. An apparatus for waveform frame timing recovery from a quadrature phase component signal of a received signal transmitted from a remote source, said received signal including an analog segment and a digital segment, said digital segment comprising an OFDM waveform with at least one pair of constant envelope carriers, wherein the sum of said pair of constant envelope carriers are in phase-quadrature with an analog segment carrier, said apparatus comprising:

a numerically controlled oscillator for providing a first stable reference signal;

a phase shifter coupled to receive said first stable reference signal for providing a second stable reference signal, said second stable reference signal being at a fixed 90° phase offset to said first stable reference signal;

a first mixing means coupled to receive said quadrature phase component signal and said first stable reference signal for producing a first mixed signal;

a second mixing means coupled to receive said quadrature phase component signal and said second stable reference signal for producing a second mixed signal;

a first integrator coupled to receive said first mixed signal for producing a first integrator output signal by performing an integration over a time period, said time period being an integer multiple of a frame duration, including a single frame duration;

a second integrator coupled to receive said second mixed signal for producing a second integrator output signal by performing an integration over said time period;

a multiplying means coupled to receive said first integrator output signal and said second integrator output signal for producing an error value;

means also coupled to receive said first integrator output signal for establishing the absolute value of the first integrator output signal;

means coupled to receive output of said absolute value establishing means for measuring variance of the absolute value of said first integrator output signal; and means coupled to receive said variance value for comparing said variance value with a threshold value to trigger a command signal to slip integration interval phase by one-half symbol time.

4. An apparatus for waveform frame timing recovery according to claim 3 further including means coupled to receive said first integrator output signal for measuring a constant envelope signal power during a single frame; and means coupled to said constant envelope signal power measuring means for scaling automatically.

5. An apparatus for waveform frame timing recovery according to claim 3 further comprising:

a timing means coupled to receive said error value and said command signal for storing a conversion period value and allowing adjustment of said conversion period value;

a clock generating circuit for generating a clocking signal;

a counter coupled to receive said clocking signal for producing a numerical count from said clock signal; and means coupled to receive said conversion period value and said numerical count for controlling the timing of conversion of said time domain signal by comparing said conversion period value to said numerical count.

6. A method for waveform frame timing recovery from a received quadrature phase component of a received signal, said method comprising the steps of:

generating a first stable reference signal;

generating a second stable reference signal, said signal being at a fixed 90° phase offset to said first stable reference signal;

mixing said first stable reference signal with said received quadrature phase component signal to produce a first mixed signal;

mixing said second stable reference signal with said received quadrature phase component signal to produce a second mixed signal;

integrating said first mixed signal over an integer multiple of frame intervals, including a single frame interval, to produce a first integrator output signal;

integrating said second mixed signal over an integer multiple of frame intervals, including a single frame interval, to produce a second integrator output signal;

multiplying said first and second integrator output signals to produce an error value;

measuring variance of the absolute value of said first integrator output signal; and comparing said variance value with a preset threshold value to selectively generate a command signal to slip integration interval phase by one-half symbol time.

7. A method for waveform frame timing recovery according to claim 6 wherein said first integrator output signal also controls signal scaling.

8. A method for waveform frame timing recovery according to claim 6 further comprising:

altering value stored in a period register according to said error value and said command signal;

producing a numerical value from a clock signal; and comparing numerical count in said period register to said numerical count from said clock signal to generate a converter clock signal, said converter clock signal synchronizing digital conversion of said received signal.

9. In an apparatus for demodulating a received signal transmitted from a remote source, said received signal including an analog segment and a digital segment, said digital segment comprising an OFDM waveform with at least one pair of constant envelope carriers, wherein the sum of said pair of constant envelope carriers are in phase-quadrature with an analog segment carrier, an apparatus for maintaining signal level in said digital segment comprising:

means for measuring constant envelope signal power in one or an integer multiple of frames of said signal to produce an error signal; and scaling circuit means for using said error signal to control signal level.

* * * * *